(12) United States Patent
Tomlin

(10) Patent No.: US 9,251,067 B1
(45) Date of Patent: Feb. 2, 2016

(54) HIGH SPEED TRIM COMMAND PROCESSING IN A SOLID STATE DRIVE

(71) Applicant: Western Digital Technologies, Inc., Irvine, CA (US)

(72) Inventor: Andrew J. Tomlin, San Jose, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 568 days.

(21) Appl. No.: 13/666,883

(22) Filed: Nov. 1, 2012

(51) Int. Cl.
*G06F 12/00* (2006.01)
*G06F 12/02* (2006.01)

(52) U.S. Cl.
CPC .......... *G06F 12/0284* (2013.01); *G06F 12/023* (2013.01); *G06F 12/0292* (2013.01)

(58) Field of Classification Search
CPC G06F 12/0292; G06F 12/023; G06F 12/0284
See application file for complete search history.

(56) References Cited

U.S. PATENT DOCUMENTS

2011/0066808 A1 3/2011 Flynn et al.

*Primary Examiner* — Reginald Bragdon
*Assistant Examiner* — Mehdi Namazi
(74) *Attorney, Agent, or Firm* — Wilmer Cutler Pickering Hale and Dorr LLP

(57) ABSTRACT

A device may comprise a plurality of non-volatile memories configured to store a plurality of physical pages and a controller coupled thereto, configured to program and read data to and from the plurality of non-volatile memory devices. The data may be stored in a plurality of logical pages (L-Pages) of non-zero length at starting addresses within the plurality of physical pages and execute first and second commands to indicate that first and second physical locations within the plurality of non-volatile memory devices no longer contains valid data and are now free space. This may be done by carrying out first and second virtual write operations of first and second L-Pages of a predetermined length at first and second unique addresses within a virtual address range that does not correspond to any of the physical pages, and accounting for an amount of free space gained as a result of executing the commands.

33 Claims, 9 Drawing Sheets

HIGH SPEED TRIM COMMAND PROCESSING IN A SOLID STATE DRIVE

BACKGROUND

Due to the nature of the Flash memory of solid state drives (SSD), data cannot be directly overwritten, as is possible in a magnetic hard disk drive. When data is first written to an SSD, all of the cells thereof start in an erased state, enabling data to be written thereto. Data is written in SSDs on a page-basis; typically, 8-16 kilobytes (KB) in size. Conventional SSD controllers, which manage the Flash memory on the SSD and interfaces with the host system, use a Logical-to-Physical (L2P) mapping system known as Logical Block Addressing (LBA) that is part of the Flash Translation Layer (FTL). When new data comes in replacing older data already written, the SSD controller causes the new data to be written in a new location (as the SSD cannot directly overwrite the old data) and updates the logical mapping to point to the new physical location. At this juncture, the old physical location no longer holds valid data. As such, the old physical location will eventually need to be erased before it can be written again.

Conventionally, a dynamic random access memory (DRAM) table is used to store the large L2P map that maps logical entries to physical address locations on the SSD. This large L2P map is usually saved in small sections as writes come in. For example, if random writing occurs, although the system may have to update only one entry, it may nonetheless have to save the entire table or a portion thereof, including entries that have not been updated, which is inherently inefficient.

FIG. 1 shows aspects of a conventional Logical Block Addressing (LBA) scheme for an SSD. As shown therein, a map table 104 contains one entry for every logical block 102 defined for the data storage device's Flash memory 106. For example, a 64 GB SSD that supports 512 byte logical blocks may present itself to the host as having 125,000,000 logical blocks. One entry in the map table 104 contains the current location of each of the 125,000,000 logical blocks in the Flash memory 106. In a conventional SSD, a Flash page holds an integer number of logical blocks (i.e., a logical block does not span across Flash pages). In this conventional example, an 8 KB Flash page would hold 16 logical blocks (of size 512 bytes). Therefore, each entry in the logical-to-physical map table 104 contains a field 108 identifying the flash die on which the logical block is stored, a field 110 identifying the flash block on which the logical block is stored, another field 112 identifying the flash page within the block and a field 114 identifying the offset within the flash page that identifies where the logical block data begins in the identified flash page. The large size of the map table 104 prevents the table from being held inside the SSD controller. Conventionally, the large map table 104 is held in an external DRAM connected to the SSD controller. As the map table 104 is stored in volatile DRAM, it must be restored when the SSD powers up, which can take a long time, due to the large size of the table.

When a logical block is read, the corresponding entry in the map table 104 is read to determine the location in Flash memory to be read. A read is then performed to the Flash page specified in the corresponding entry in the map table 104. When the read data is available for the Flash page, the data at the offset specified by the map entry is transferred from the SSD to the host. When a logical block is written, the corresponding entry in the map table 104 is updated to reflect the new location of the logical block. It is to be noted that when a logical block is written, the Flash memory will initially contain at least two versions of the logical block; namely, the valid, most recently written version (pointed to by the map table 104) and at least one other, older version thereof that is stale and is no longer pointed to by any entry in the map table 104. These "stale" data are referred to as garbage, which occupies space that must be accounted for, collected, erased and made available for future use.

The TRIM Command

The SATA protocol defines a "TRIM" command specifically for use with Flash-based SSDs. The TRIM command may reduce Write Amplification (WA) by reducing the garbage collection overhead. TRIM is a command that is issued by a host Operating System (OS) to indicate that one or more logical blocks are no longer used and may be deleted. Conventionally, to implement the TRIM command, the following sequence may be followed:

a. The current free space for the block in which the TRIMed logical block is located may be increased by the size of the TRIMed logical block.

b. The logical-to-physical map maintained in volatile memory is then updated to indicate that the logical block in question has been TRIMed.

c. When garbage collecting a block having TRIMed logical blocks, the logical blocks that have been TRIMed are not relocated.

d. When a TRIMed logical block is read, data is not read from Flash memory, but a predetermined string or code is returned (such as all 0's, for example).

e. If the host writes to a TRIMed block, data may be written as normal except that the amount of space freed will be 0.

In conventional SSDs implementing the conventional logical-to-physical addressing scheme, the entry to be TRIMed in the map table 104 must be obsoleted, the map table 104 updated and the updated map table 104 saved in whole or in part, which is inefficient.

DETAILED DESCRIPTION

System Overview

Figure 1:
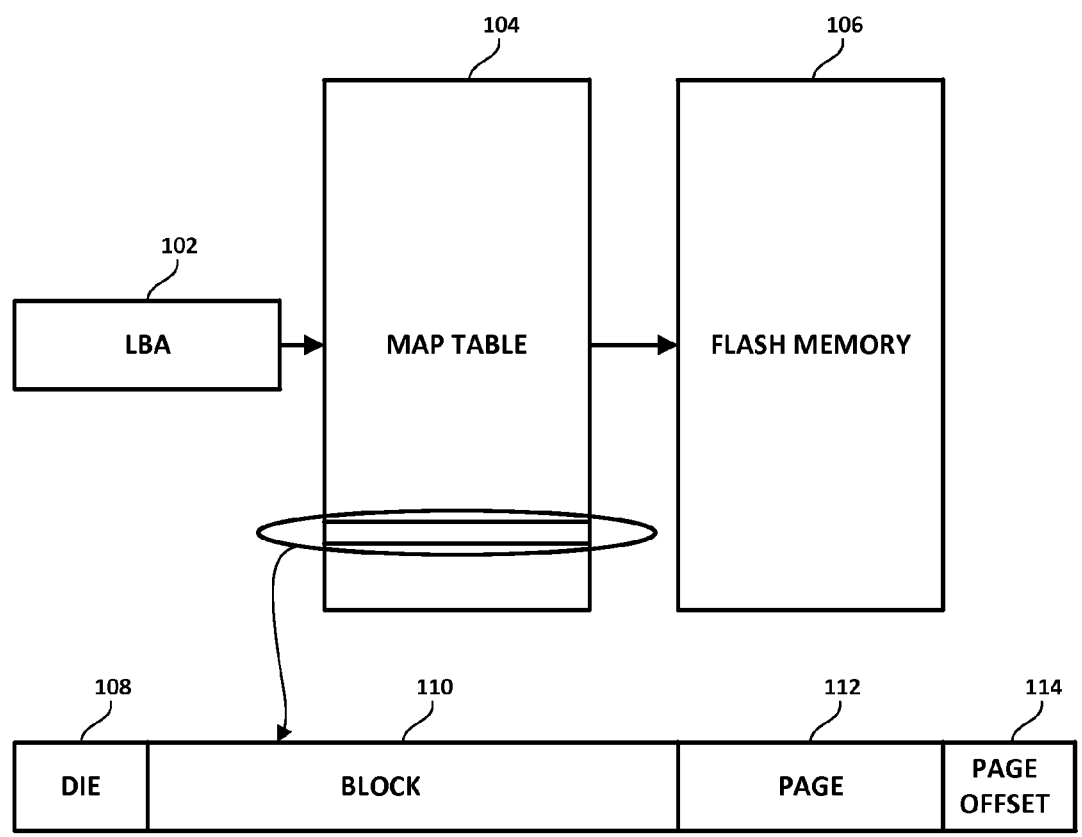
FIG. 1 shows aspects of a conventional Logical Block Addressing (LBA) scheme for SSDs.
Figure 2:
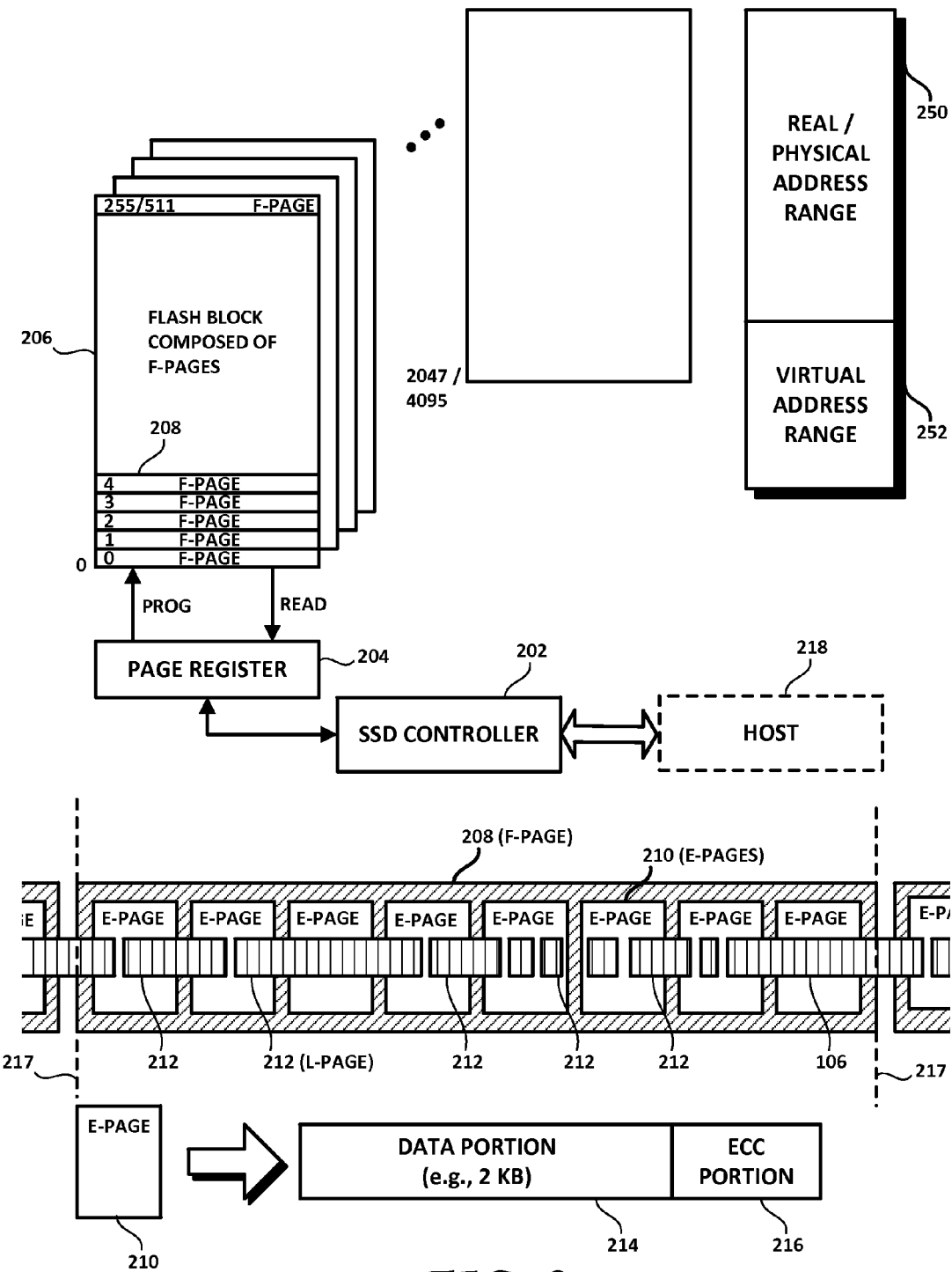
FIG. 2 is a diagram showing aspects of the physical and logical data organization of an SSD according to one embodiment.

FIG. 2 is a diagram showing aspects of the physical and logical data organization of a data storage device according to one embodiment. In one embodiment, the data storage device is an SSD. In another embodiment, the data storage device is a hybrid drive including Flash memory and rotating magnetic storage media. The disclosure is applicable to both SSD and hybrid implementations, but for the sake of simplicity the various embodiments are described with reference to SSD-based implementations. A data storage device controller 202 according to one embodiment may be configured to be coupled to a host, as shown at reference numeral 218. The host 218 may utilize a logical block addressing (LBA) scheme. While the LBA size is normally fixed, the host can vary the size of the LBA dynamically. For example, the physical data storage device may be logically portioned to support partitions configured for LBAs of different sizes. However, such partitions are not required for the physical device to support LBAs of different sizes at the same time. For example, the LBA size may vary by interface and interface mode. Indeed, while 512 bytes is most common, 4 KB is also becoming more common, as are 512+(520, 528 etc.) and 4 KB+ (4 KB+8, 4K+16 etc.) formats. As shown therein, the data storage device controller 202 may comprise or be coupled to a page register 204. The page register 204 may be configured to enable the controller 202 to read data from and store data to the data storage device. The controller 202 may be configured to program and read data from an array of Flash memory devices responsive to data access commands from the host 218. While the description herein refers to Flash memory generally, it is understood that the array of memory devices may comprise one or more of various types of non-volatile memory devices such as Flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

The page register 204 may be configured to enable the controller 202 to read data from and store data to the array. According to one embodiment, the array of Flash memory devices may comprise a plurality of non-volatile memory devices in die (e.g., 128 dies), each of which comprises a plurality of blocks, such as shown at 206 in FIG. 2. Other page registers 204 (not shown), may be coupled to blocks on other die. A combination of Flash blocks, grouped together, may be called a Superblock or S-Block. In some embodiments, the individual blocks that form an S-Block may be chosen from one or more dies, planes or other levels of granularity. An S-Block, therefore, may comprise a plurality of Flash blocks, spread across one or more die, that are combined together. In this manner, the S-Block may form a unit on which the Flash Management System (FMS) operates. In some embodiments, the individual blocks that form an S-Block may be chosen according to a different granularity than at the die level, such as the case when the memory devices include dies that are sub-divided into structures such as planes (i.e., blocks may be taken from individual planes). According to one embodiment, allocation, erasure and garbage collection may be carried out at the S-Block level. In other embodiments, the FMS may perform data operations according to other logical groupings such as pages, blocks, planes, dies, etc.

In turn, each of the Flash blocks 206 comprises a plurality of Flash pages (F-Pages) 208. Each F-Page may be of a fixed size such as, for example, 16 KB. The F-Page, according to one embodiment, is the size of the minimum unit of program for a given Flash device. As also shown in FIG. 2, each F-Page 208 may be configured to accommodate a plurality of physical pages, hereinafter referred to as E-Pages 210. The term "E-Page" refers to a data structure stored in Flash memory on which an error correcting code (ECC) has been applied. According to one embodiment, the E-Page 210 may form the basis for physical addressing within the data storage device and may constitute the minimum unit of Flash read data transfer. The E-Page 210, therefore, may be (but need not be) of a predetermined fixed size (such as 2 KB, for example) and determine the size of the payload (e.g., host data) of the ECC system. According to one embodiment, each F-Page 208 may be configured to fit a predetermined plurality of E-Pages 210 within its boundaries. For example, given 16 KB size F-Pages 208 and a fixed size of 2 KB per E-Page 210, eight E-Pages 210 fit within a single F-Page 208, as shown in FIG. 2. In any event, according to one embodiment, a power of 2 multiple of E-Pages 210, including ECC, may be configured to fit into an F-Page 208. Each E-Page 210 may comprise a data portion 214 and, depending on where the E-Page 210 is located, may also comprise an ECC portion 216. Neither the data portion 214 nor the ECC portion 216 need be fixed in size. The address of an E-Page uniquely identifies the location of the E-Page within the Flash memory. For example, the E-Page's address may specify the Flash channel, a particular die within the identified Flash channel, a particular block within the die, a particular F-Page and, finally, the E-Page within the identified F-Page.

To bridge between physical addressing on the data storage device and logical block addressing by the host, a logical page (L-Page) construct is introduced. An L-Page, denoted in FIG. 2 at reference numeral 212 may comprise the minimum unit of address translation used by the FMS. Each L-Page, according to one embodiment, may be associated with an L-Page number. The L-Page numbers of L-Pages 212, therefore, may be configured to enable the controller 202 to logically reference host data stored in one or more of the physical pages, such as the E-Pages 210. The L-Page 212 may also be utilized as the basic unit of compression. According to one embodiment, unlike F-Pages 208 and E-Pages 210, L-Pages 212 are not fixed in size and may vary in size, due to variability in the compression of data to be stored. Since the compressibility of data varies, a 4 KB amount of data of one type may be compressed into a 2 KB L-Page while a 4 KB amount of data of a different type may be compressed into a 1 KB L-Page, for example. Due to such compression, therefore, the size of L-Pages may vary within a range defined by a minimum compressed size of, for example, 24 bytes to a maximum uncompressed size of, for example, 4 KB or 4 KB+. Other sizes and ranges may be implemented. As shown in FIG. 2, L-Pages 212 need not be aligned with the boundaries of E-Page 210. Indeed, L-Pages 212 may be configured to have a starting address that is aligned with an F-Page 208 and/or E-Page 210 boundary, but also may be configured to be unaligned with either of the boundaries of an F-Page 208 or E-Page 210. That is, an L-Page starting address may be located at a non-zero offset from either the start or ending addresses of the F-Pages 208 or the start or ending addresses of the E-Pages 210, as shown in FIG. 2. As the L-Pages 212 are not fixed in size and may be smaller than the fixed-size E-Pages 210, more than one L-Page 212 may fit within a single E-Page 210. Similarly, as the L-Pages 212 may be larger in size than the E-Pages 210, L-Pages 212 may span more than one E-Page, and may even cross the boundaries of F-Pages 210, shown in FIG. 2 at numeral 217.

For example, where the LBA size is 512 or 512+ bytes, a maximum of, for example, eight sequential LBAs may be packed into a 4 KB L-Page 212, given that an uncompressed L-Page 212 may be 4 KB to 4 KB+. It is to be noted that, according to one embodiment, the exact logical size of an L-Page 212 is unimportant as, after compression, the physical size may span from few bytes at minimum size to thousands of bytes at full size. For example, for 4 TB SSD device, 30 bits of addressing may be used to address each L-Page 212 to cover for an amount of L-Pages that could potentially be present in such a SSD.

Each of the blocks 206 map onto a physical address range 250. The physical address range 250 spans all of the blocks on all dies of the Flash memory to which the controller 202 may be coupled. According to one embodiment, the controller 202 may be configured to address an expanded range of addresses. As shown in FIG. 2, the controller 202 may be configured to also address a virtual address range 252. Unlike the physical address range 250 that enables the controller 202 to access physical locations on the Flash memory, the virtual address range 252 does not map to any physical location; it is merely an address range. As will be further described, the use of virtual address range 252 enables the controller 202 to carry out TRIM commands in a very efficient manner.

Figure 3:
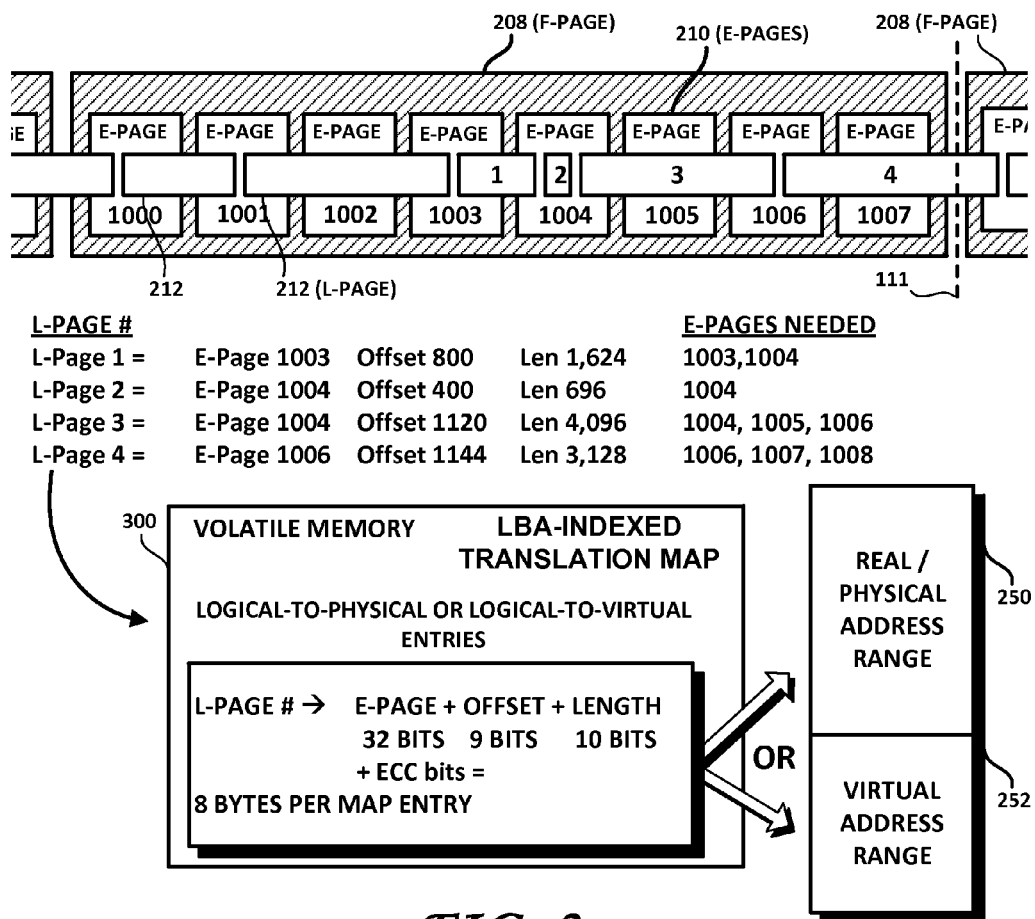
FIG. 3 shows an LBA-indexed translation map comprising both logical-to-physical entries and logical-to-virtual entries, according to one embodiment.

FIG. 3 shows an LBA-indexed translation map 300 and illustrative entries thereof, according to one embodiment. According to one embodiment, the LBA-indexed translation map 300 may comprise entries mapping L-Pages to the real/physical address range 250 and to the virtual address range 252. Entries mapping to addresses in the virtual address range 252 will be discussed later in conjunction with the processing of TRIM commands, while entries mapping to addresses in the physical address range 250 are described below.

As the host data is referenced by the host in L-Pages 212 and as the data storage device stores the L-Pages 212 in one or more contiguous E-Pages 210, logical-to-physical entries of the LBA-indexed translation map 300 enable the controller 202 to associate an L-Page number of an L-Page 212 to one or more E-Pages 210. According to one embodiment, the LBA-indexed translation map 300 is a linear array having one entry per L-Page 212. Such an LBA-indexed translation map 300 may be stored in a volatile memory, such as a DRAM or SRAM. FIG. 3 also shows the structure of entries in the LBA-indexed translation map 300 for four different L-Pages 212, which L-Pages 212 in FIG. 3 are associated with L-Page numbers denoted as L-Page 1, L-Page 2, L-Page 3 and L-Page 4 and which are mapped to the real/physical address range 250. The structure of a logical-to-virtual entry may follow a similar format.

According to one embodiment, each L-Page stored in the data storage device may be pointed to by a single and unique entry in the LBA-indexed translation map 300. Accordingly, in the example being developed herewith, four entries are shown. According to one embodiment, each entry of the LBA-indexed translation map 300 may comprise information for an L-Page that is indexed by an L-Page number. That information may comprise an identification of the physical page (e.g., E-Page) containing the start address of the L-Page being referenced, the offset of the start address within the physical page (e.g., E-Page) and the length of the L-Page. In addition, a plurality of ECC bits may provide error correction functionality for the map entry. For example, and as shown in FIG. 3, and assuming an E-Page size of 2 KB, L-Page 1 may be referenced in the LBA-indexed translation map 300 as follows: E-Page 1003, offset 800, length 1624, followed by a predetermined number of ECC bits (not shown). That is, in physical address terms, the start of L-Page 1 is within (not aligned with) E-Page 1003, and is located at an offset from the starting physical location of the E-Page 1003 that is equal to 800 bytes. Compressed L-Page 1, furthermore, extends 1,624 bytes, thereby crossing an E-Page boundary to E-Page 1004. Therefore, E-Pages 1003 and 1004 each store a portion of the L-Page 212 denoted by L-Page number L-Page 1. Similarly, the compressed L-Page referenced by L-Page number L-Page 2 is stored entirely within E-Page 1004, and begins at an offset therein of 400 bytes and extends only 696 bytes within E-Page 1004. The compressed L-Page associated with L-Page number L-Page 3 starts within E-Page 1004 at an offset of 1,120 and extends 4,096 bytes past E-Page 1005 and into E-Page 1006. Therefore, the L-Page associated with L-Page number L-Page 3 spans a portion of E-Page 1004, all of E-Page 1005 and a portion of E-Page 1006. Finally, the L-Page associated with L-Page number L-Page 4 begins within E-Page 1006 at an offset of 1,144 bytes, and extends 3,128 bytes to fully span E-Page 1007, crossing an F-Page boundary into E-Page 1008 of the next F-Page. In one embodiment, there may be 24 bytes (as reflected in the example being developed) of metadata included in each L-Page that are not included in the length specified. In other embodiments, the metadata may be included in the L-Page length.

Collectively, each of these constituent identifier fields (E-Page, offset, length and ECC) making up each logical-to-physical entry of the LBA-indexed translation map 300 may be, for example, 8 bytes in size. That is, for an exemplary 4 TB drive, the address of the E-Page may be 32 bits in size, the offset may be 12 bits (for E-Page data portions up to 4 KB) in size, the length may be 10 bits in size and the ECC field may be provided. Other organizations and bit-widths are possible. Such an 8 byte entry may be created each time an L-Page is written or modified, to enable the controller 202 to keep track of the host data, written in L-Pages, within the flash storage. This 8-byte entry in the LBA-indexed translation map 300 may be indexed by an L-Page number or LPN. In other words, according to one embodiment, the L-Page number functions as an index into the LBA-indexed translation map 300. It is to be noted that, in the case of a 4 KB sector size, the LBA is the same as the LPN. The LPN, therefore, may constitute the address of the entry within the volatile memory. When the controller 202 receives a read command from the host 218, the LPN may be derived from the supplied LBA and used to index into the LBA-indexed translation map 300 to extract the location of the data to be read in the flash memory. When the controller 202 receives a write command from the host, the LPN may be constructed from the LBA, thereby constructing a logical-to-physical entry of the LBA-indexed translation to enable the LBA-indexed translation map 300 to be so modified. For example, a new entry therein may be created. Depending upon the size of the volatile memory storing the LBA-indexed translation map 300, the LPN may be stored in a single entry or broken into, for example, a first entry identifying the E-Page containing the starting address of the L-Page in question (plus ECC bits) and a second entry identifying the offset and length (plus ECC bits). According to one embodiment, therefore, these two entries may together correspond and point to a single L-Page within the flash memory. In other embodiments, the specific format of entries in the LBA-indexed translation map 300 may be different from the examples shown above.

As also shown in FIG. 3, LBA-indexed translation map 300 may be conceptually expanded, according to an embodiment, to include entries mapping L-Pages to addresses within the virtual address range 252. Again, although the virtual addresses in the virtual address range do not point to any physical locations (which non-existent locations, therefore, cannot store any data), the mapping of L-Pages to the virtual address range 252 may, nevertheless, be carried out. For example, in one embodiment, a TRIM command from the host directed to an LBA may be handled by a "virtual write" to an address within the virtual address range 252. According to one embodiment and as shown in FIG. 3, any entry in the LBA-indexed translation map 300 may point to a location in the real/physical address range 250 or to a location in the virtual address range 252. Entries of the LBA-indexed translation map 300 pointing to locations in the real/physical address range 250 may be interspersed with entries in the LBA-indexed map pointing to locations in the virtual address range 252. The purpose and advantages of mapping L-Pages to the virtual address range 252 are made apparent and are described in detail hereunder.

S-Journals and S-Journal Map

As the LBA-indexed translation map 300 may be stored in a volatile memory, it may need to be rebuilt upon startup or any other loss of power to the volatile memory. This, therefore, requires some mechanism and information to be stored in a non-volatile memory that will enable the controller 202 to reconstruct the LBA-indexed translation map 300 before the controller can "know" where the L-Pages are stored in the non-volatile memory after startup or after a power-fail event. According to one embodiment, such mechanism and information are embodied in a construct that may be called a System Journal, or S-Journal. According to one embodiment, the controller 202 may be configured to maintain, in the plurality of non-volatile memory devices (e.g., in one or more of the blocks 206 in one or more die, channel or plane), a plurality of S-Journals defining physical-to-logical address correspondences. According to one embodiment, each S-Journal covers a pre-determined range of physical pages (e.g., E-Pages). According to one embodiment, each S-Journal may comprise a plurality of journal entries, with each entry being configured to associate one or more physical pages, such as E-Pages, to the L-Page number of each L-Page. According to one embodiment, each time the controller 202 restarts or whenever the LBA-indexed translation map 300 is to be rebuilt either partially or entirely, the controller 202 reads the S-Journals and, from the information read from the S-Journal entries, rebuilds the LBA-indexed translation map 300.

Figure 4:
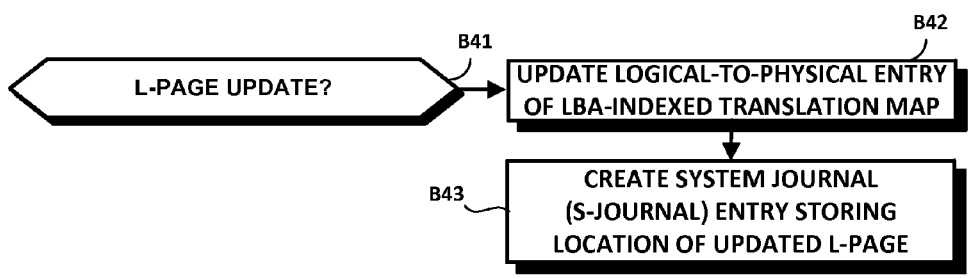
FIG. 4 shows aspects of a method for updating a logical-to-physical entry of an LBA-indexed translation map and for creating an S-Journal entry, according to one embodiment.

FIG. 4 shows aspects of a method for updating logical-to-physical entries of the LBA-indexed translation map 300 and for creating an S-Journal entry, according to one embodiment. As shown therein, to ensure that the LBA-indexed translation map 300 is kept up-to-date, whenever an L-Page is written or otherwise updated as shown at block B41, the LBA-indexed translation map 300 may be updated as shown at B42. As shown at B43, an S-Journal entry may also be created, storing therein information pointing to the location of the updated L-Page. In this manner, both the LBA-indexed translation map 300 and the S-Journals are updated when new writes occur (e.g., as the host issues writes to non-volatile memory, as garbage collection/wear leveling occurs, etc.). Write operations to the non-volatile memory devices to maintain a power-safe copy of address translation data may be configured, therefore, to be triggered by newly created journal entries (which may be just a few bytes in size) instead of re-saving all or a portion of the LBA-indexed translation map 300, such that Write Amplification (WA) is reduced. The updating of the S-Journals ensures that the controller 202 can access a newly updated L-Page and that the LBA-indexed translation map 300 may be reconstructed upon restart or other information-erasing power event affecting the volatile memory in which the LBA-indexed translation map 300 is stored. Moreover, in addition to their utility in rebuilding the LBA-indexed translation map 300, the S-Journals are useful in enabling effective Garbage Collection (GC). Indeed, the S-Journals may contain the last-in-time update to all L-Page numbers, and also may contain stale entries, entries that do not point to a valid L-Page.

Figure 5A:
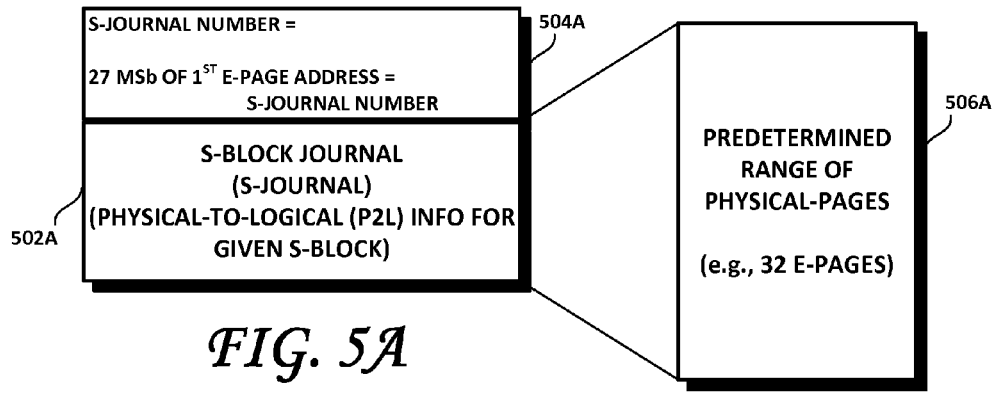
FIG. 5A is a block diagram of an S-Journal, according to one embodiment.

According to one embodiment, the S-Journals may be the main flash management data written to the non-volatile memory. S-Journals may contain mapping information for a given S-Block and may contain the Physical-to-Logical (P2L) information for a given S-Block. FIG. 5A is a block diagram showing aspects of an S-Journal, according to one embodiment. As shown therein, each S-Journal 502A covers a predetermined physical region of the non-volatile memory such as, for example, 32 E-Pages as shown at 506A, which are addressable using 5 bits. Each S-Journal 502A may be identified by an S-Journal Number, which may be part of a header 504A that may include other information about the S-Journal. The S-Journal Number may comprise a portion of the address of the first physical page covered by the S-Journal. For example, the S-Journal Number of S-Journal 502A may comprise, for example, the 27 Most Significant Bits (MSb) of the first E-Page address covered by this S-Journal 502A.

Figure 5B:
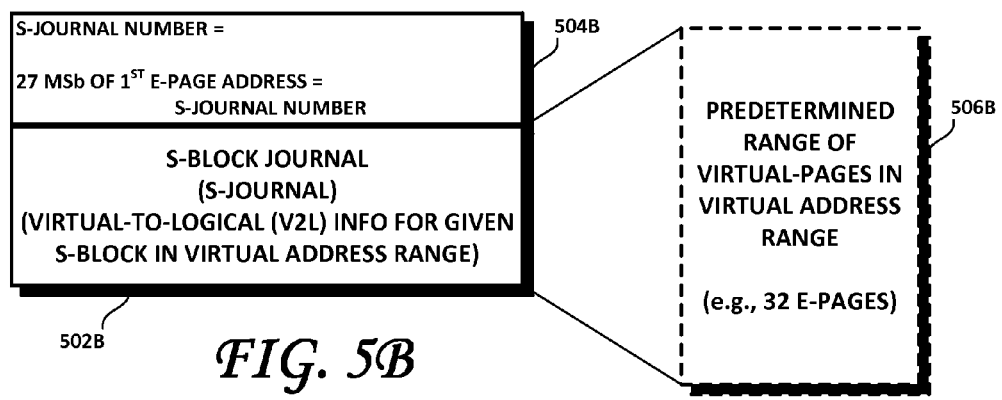
FIG. 5B is a block diagram of an S-Journal configured for the virtual address range, according to one embodiment.

FIG. 5B is a block diagram of an S-Journal for the virtual address range 252, according to one embodiment. As shown therein, S-Journals may contain the virtual-to-logical (V2L) mapping information for a given Virtual S-Block (VS-Block) in the virtual address range. According to one embodiment, each VS-Block may comprise one or more virtual memory blocks in the virtual address range 252. Again, as the virtual address range is but a range of address having no correspondence to any physical memory, the VS-Block is but a range of such addresses in the virtual address range 252 and does not point to any locations in physical memory. As shown in FIG. 5B, each virtual address range S-Journal 502B may be configured to cover a predetermined range of addresses in the virtual address range 252 such as an address range that is equivalent to, for example, 32 E-Pages as shown at 506B, which are addressable using 5 bits. As with the S-Journals in FIG. 5A, each virtual address range S-Journal 502B may be identified by an S-Journal Number, which may be part of a header 504B that may include other information about the S-Journal. The S-Journal Number may comprise a starting address within the virtual address range 252 covered by the virtual address range S-Journal. For example, the S-Journal Number of virtual address range S-Journal 502B may comprise, for example, the 27 Most Significant Bits (MSb) of the starting address within the virtual address range covered by this virtual address range S-Journal 502B. According to one embodiment, each entry of a virtual address range S-Journal 502B may be configured to associate one or more virtual pages of the VS-Block to each selected L-Page.

Figure 6:
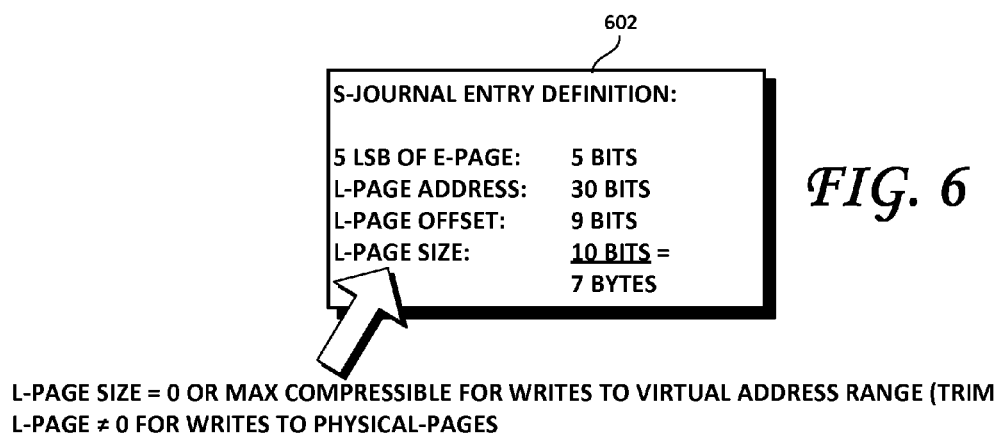
FIG. 6 shows an exemplary organization of one entry of an S-Journal, according to one embodiment.

FIG. 6 shows an exemplary organization of one entry 602 of an S-Journal 502 (which could be an S-Journal 502A or 502B), according to one embodiment. Each entry 602 of the S-Journal 502 may point to the starting address of one L-Page, which is physically addressed in E-Pages. Each entry 602 may comprise, for example, a number (5, for example) of Least Significant Bits (LSbs) of the address of the E-Page containing the start L-Page. The full E-Page address is obtained by concatenating these 5 LSbs with the 27 MSbs of the S-Journal Number in the header 504. In addition, the entry 602 may comprise the L-Page number, its offset within the identified E-Page and its size. For example, each entry 602 of an S-Journal may comprise the 5 LSbs of the address of first E-Page covered by this S-Journal entry, 30 bits of L-Page number, 9 bits of E-Page offset and 10 bits of L-Page size, adding up to an overall size of about 7 bytes. Various other internal journal entry formats may be used in other embodiments.

According to one embodiment, due to the variability in the compression or the host configuration of the data stored in L-Pages, a variable number of L-Pages may be stored in a physical area, such as a physical area equal to 32 E-Pages, as shown at 506. As a result of the use of compression and the consequent variability in the sizes of L-Pages, S-Journals may comprise a variable number of entries. For example, according to one embodiment, at maximum compression, an L-Page may be a predetermined number of bytes in size such as, for example, 24 bytes. In this case, an S-Journal may comprise over 2,500 entries, referencing an equal number of L-Pages, one L-Page per S-Journal entry 602. As also noted in FIG. 6, according to one embodiment, the L-Page size for writes to physical pages in the non-volatile memory is non-zero. That is, each L-Page written to one or more physical pages within the non-volatile memory has a non-zero length.

Conversely, for virtual writes to the virtual address range 252, which may be used to handle a TRIM command as further described below, the size of the L-Page may be zero, as the virtual address range 252 does not correspond to any real, physical memory space in the non-volatile memory, and thus cannot store any data. Since a virtual address range S-Journal may cover an address range in the virtual address range 252 equivalent to, for example, 32 E-Pages and since writes of L-Pages of zero length, potentially an infinite number of entries could fit within such a virtual address range S-Journal. To address this according to one embodiment, virtual writes to the virtual address range 252 may be considered to be writes of L-Pages having a non-zero size. According to one embodiment, the non-zero size is equal to a maximally-compressed L-Page of a pre-determined size. According to one embodiment, a maximally-compressed L-Page may be 24 bytes in length. However, it is to be understood that the aforementioned maximally-compressed L-Pages are not actually written anywhere (hence the "virtual write" designation), as the virtual address range 252 does not correspond to any real physical pages in the non-volatile memory.

Figure 7A:
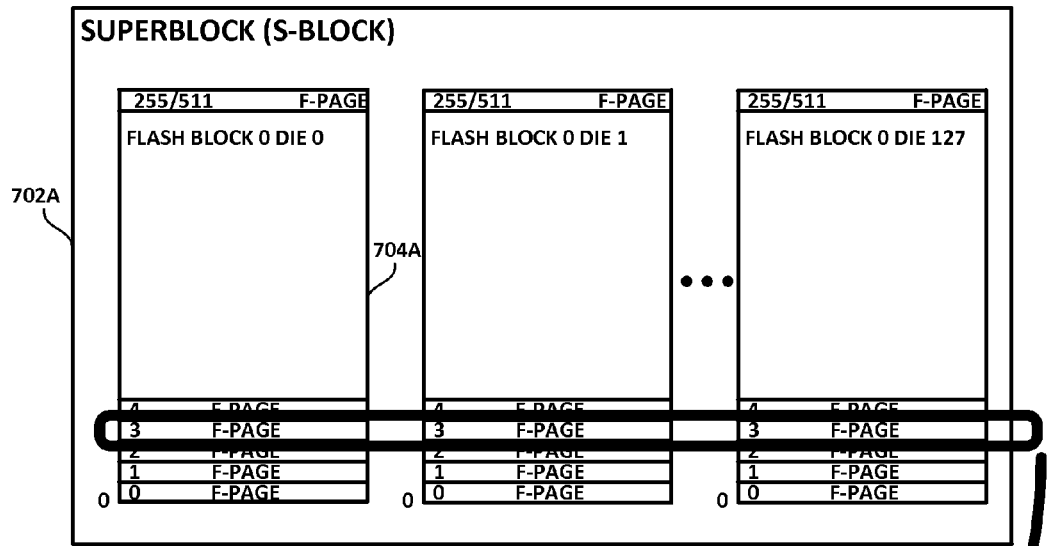
FIG. 7A is a block diagram of a superblock (S-Block), according to one embodiment.
Figure 8A:
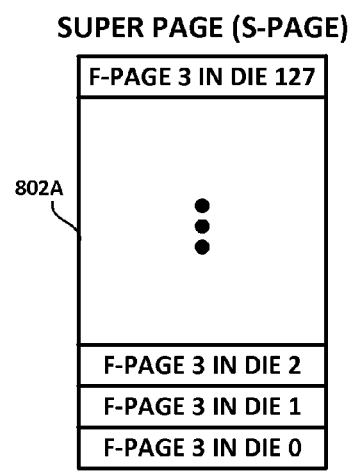
FIG. 8A shows another view of a Super page (S-Page), according to one embodiment.

As noted above, an S-Journal may be configured to contain mapping information for a given S-Block. More precisely, according to one embodiment, S-Journals contain the mapping information for a predetermined range of E-Pages within a given S-Block. FIG. 7A is a block diagram of an S-Block, according to one embodiment. As shown therein, an S-Block 702A may comprise one flash block (F-Block) 704A (as also shown at 206 in FIG. 2) per die. An S-Block, therefore, may be thought of as a collection of F-Blocks, one F-Block per die, that are combined together to form a unit of the Flash Management System. According to one embodiment, allocation, erasure and GC may be managed at the S-Block level. Each F-Block 704A, as shown in FIG. 7A, may comprise a plurality of flash pages (F-Page) such as, for example, 256 or 512 F-Pages. An F-Page, according to one embodiment, may be the size of the minimum unit of program for a given non-volatile memory device. FIG. 8A shows a super page (S-Page), according to one embodiment. As shown therein, an S-Page 802A may comprise one F-Page per F-Block of an S-Block, meaning that an S-Page spans across an entire S-Block.

Figure 7B:
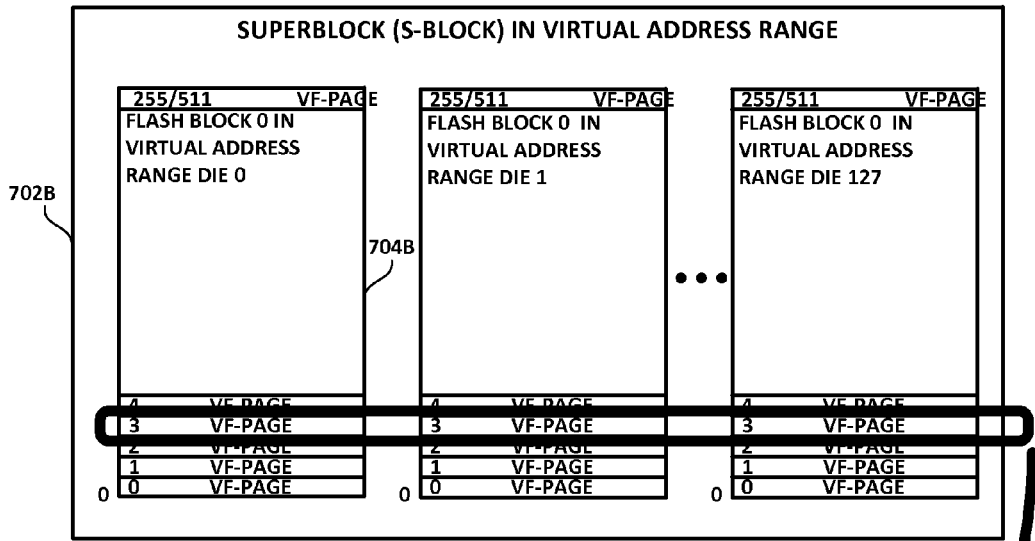
FIG. 7B is a block diagram of a superblock (S-Block) in the virtual address range, according to one embodiment.
Figure 8B:
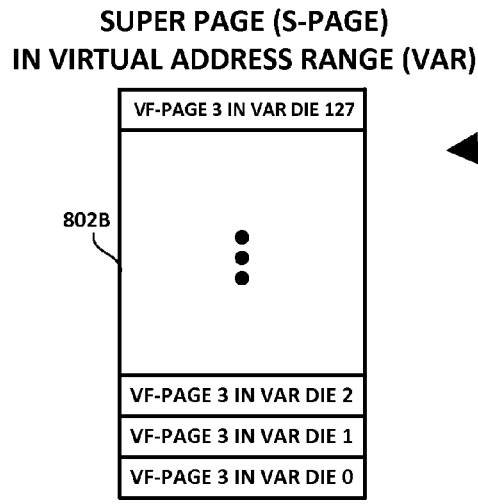
FIG. 8B shows another view of a Super page (S-Page) in the invisible band (VF-Page), according to one embodiment.

FIG. 7B is a block diagram of a VS-Block, according to one embodiment. VS-Blocks, according to one embodiment, are a set of blocks whose addresses begin after the addresses of the real physical blocks of the non-volatile memory. Their logical organization is similar to that of the S-Blocks shown in FIG. 7A. Indeed, as shown in FIG. 7B, a VS-Block 702B may comprise one virtual flash block (VF-Block) 704B per die. A VS-Block, therefore, may be thought of as a collection of VF-Blocks, one VF-Block per die, that are combined together. According to one embodiment, allocation, erasure and GC within the virtual address range 252 may be managed at the VS-Block level. Each VF-Block 704B, as shown in FIG. 7B, may comprise a plurality of Virtual Flash pages (VF-Page) such as, for example, 256 or 512 VF-Pages. FIG. 8B shows a VS-Page, according to one embodiment. As shown therein, a VS-Page 802B may comprise one VF-Page per VF-Block of a VS-Block, meaning that a VS-Page spans across an entire VS-Block. Note that the block(s) and/or die(s) as shown are virtual data entities and do not correspond to physical blocks and/or dies on the non-volatile memory.

Relationships Among Various Data Structures

Figure 9A:
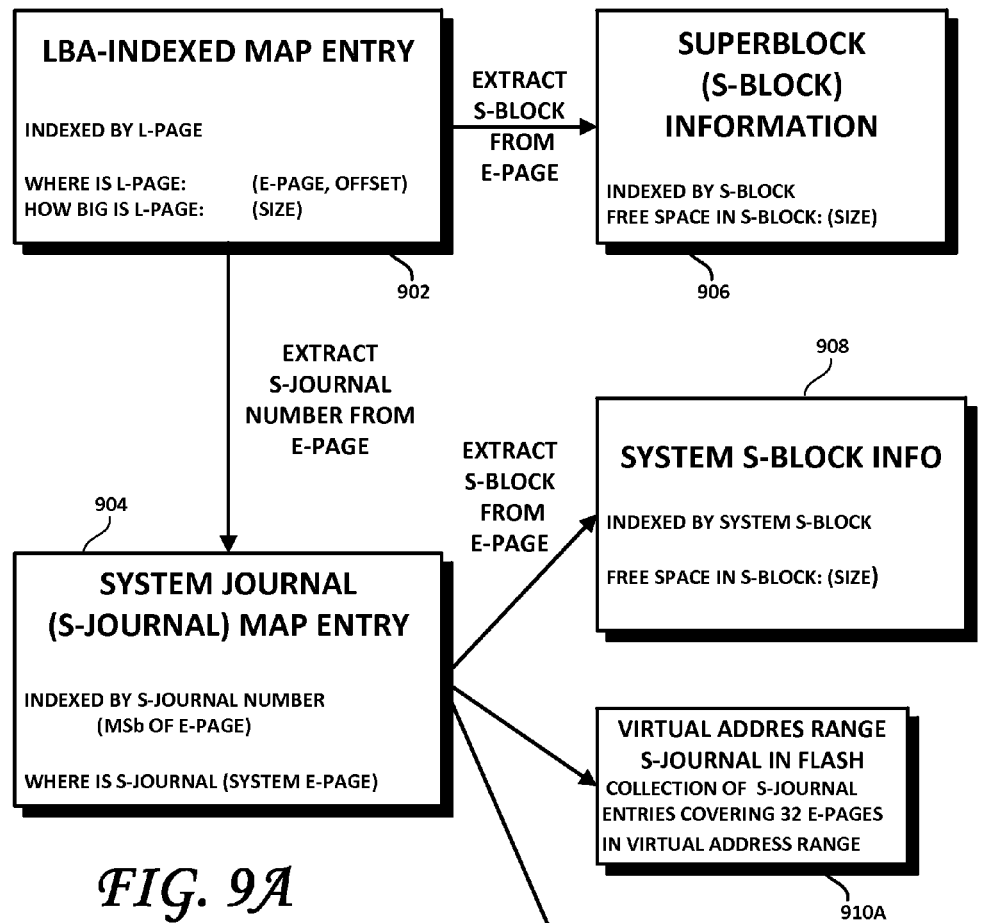
FIG. 9A shows relationships between entries in the LBA-indexed translation map, S-Journals and S-Blocks, according to one embodiment.

FIG. 9A shows relationships among the LBA-indexed translation map 300, the S-Journal map and S-Blocks, according to one embodiment. Reference 902 denotes an entry in the LBA-indexed translation map 300 (stored in DRAM in one embodiment). According to one embodiment, the LBA-indexed translation map 300 may be indexed by L-Page number, in that there may be one entry 902 per L-Page in the LBA-indexed translation map 300. The physical address of the start of the L-Page in the flash memory and the size thereof may be given in the map entry 902; namely by E-Page address, offset within the E-Page and the size of the L-Page. As noted earlier, the L-Page, depending upon its size, may span one or more E-Pages and may span F-Pages and F-Blocks as well.

As shown at 904, the volatile memory (e.g., DRAM) may also store a System Journal (S-Journal) map. An entry 904 in the S-Journal map stores information related to where an S-Journal is physically located in the non-volatile memory. For example, the 27 MSbs of the E-Page physical address where the start of the L-Page is stored may constitute the S-Journal Number (as previously shown in FIG. 5). The S-Journal map entry 904 in the volatile memory may also include the address of the S-Journal in non-volatile memory, referenced in system E-Pages. From the S-Journal map entry 904 in volatile memory, System S-Block Information 908 may be extracted. The System S-Block Information 908 may be indexed by System S-Block (S-Block in an area of Flash memory termed a System Band) and may comprise, among other information regarding the S-Block, the size of any free or used space in the System S-Block. From the S-Journal map entry 904, the physical location (expressed in terms of E-Pages in the System Band) of the referenced S-Journal in non-volatile memory 910A may be extracted. The physical location in non-volatile memory of a virtual address range S-Journal covering a portion of the virtual address range 252 may also be extracted from the S-Journal map entry 904. As shown at 910B, an S-Journal covering a portion of the virtual address range 252 may comprise a plurality of entries that collectively cover an address range in the virtual address range 252 equivalent to, for example, 32 E-Pages. As noted above, each of these S-Journals in non-volatile memory may comprise a collection of S-Journal entries and cover, for example, 32 E-Pages worth of data. These S-Journals in non-volatile memory 910A and 910B enable the controller 202 to rebuild not only the logical-to-physical entries of the LBA-indexed translation map 300 in volatile memory and the logical-to-virtual entries of the LBA-indexed translation map 300, but also the S-Journal map 912, the User S-Block Information 906, and the System S-Block Information 908, in volatile memory.

Figure 9B:
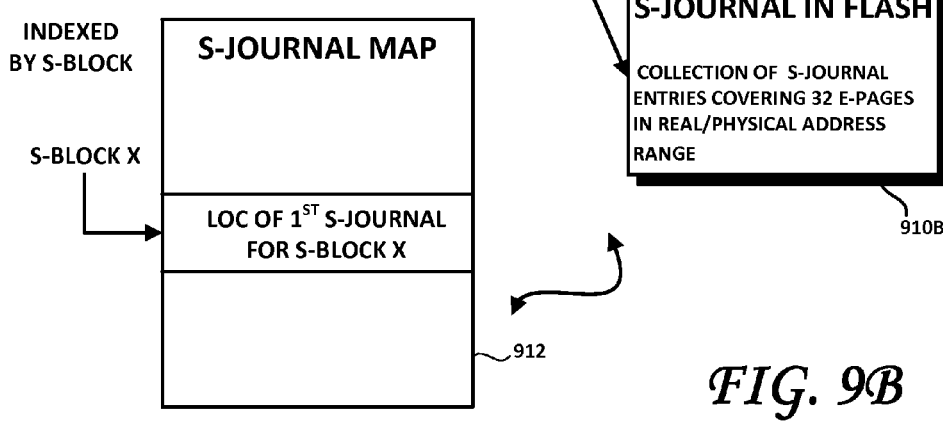
FIG. 9B is a block diagram of an S-Journal map, according to one embodiment.

FIG. 9B is a block diagram of an S-Journal Map 912, according to one embodiment. The S-Journal Map 912 may be indexed by S-Block and VS-Block number and each entry thereof may point to the start of the first S-Journal for that S-Block which, in turn, may cover a predetermined number of E-Pages (e.g., 32) of that S-Block or VS-Block. The controller 202 may be further configured to build or rebuild a map of the S-Journals and store the resulting S-Journal Map 912 in volatile memory. That is, upon restart or upon the occurrence of another event in which power fails or after a restart subsequent to error recovery, the controller 202 may read the plurality of S-Journals in a predetermined sequential order, build a map of the S-Journals stored in the non-volatile memory devices based upon the sequentially read plurality of S-Journals, and store the built S-Journal Map 912 in the volatile memory.

High Speed TRIM

The FMS comprising the LBA-indexed translation map 300 and the S-Journals may be leveraged to provide functionality enabling a high speed TRIM operation. Within the present context, the term "TRIM" is intended to cover any command or functionality that enables the controller 202 to indicate that a given L-page is no longer valid (e.g., stale) and that the physical location in non-volatile memory where that L-Page is stored may be considered to be free space. For example, within the present context, a TRIM operation may be functionally similar to, for example, a SCSI UNMAP or DISCARD operation, which indicate that an L-Page is no longer needed and may be purged or deleted. There are many other commands that may result in a similar operation. Therefore, within the present context, the term "TRIM" is expressly intended to cover any command that designates any logical construct stored in non-volatile memory as being invalid, stale, no longer needed or that may be purged or deleted without loss of useful data. As, according to one embodiment, allocation, erasure and garbage collection may be carried out at the S-Block and VS-Block level, it may be necessary to carry out free space accounting and garbage collection before a particular block may be erased and re-used. The purpose of the TRIM command and that of other functionally-similar commands, is to enable the controller 202 to indicate to the host's OS that certain designated L-pages are invalid, to account for the corresponding free space created thereby, and to enable later garbage collection and re-use of the S-Block or VS-Block.

According to one embodiment, a TRIM command may be issued and carried out without any access to the physical media; namely, the Flash Blocks 206. According to one embodiment, the logical-to-virtual entries of the LBA-indexed translation map 300 and the S-Journal system described herein may be leveraged to enable the controller 202 to carry out high speed TRIM operations by carrying out an update to the logical-to-virtual entries of the LBA-indexed translation map 300, an update to the System S-Block information table 908 and writing an entry of an S-Journal, all of which may be carried out significantly faster than an access to the Flash Blocks 206.

To do so, one embodiment may comprise carrying out a virtual write operation of an L-Page of zero length to a predetermined virtual address within a virtual address range that does not correspond to any of the physical pages and by accounting for the free space freed by the now-invalid L-Page. The virtual address range is shown at 252 in FIG. 3. It is to be noted that the real/physical address range 250 of the F-Blocks 206 may be greater than the virtual address range 252. In a manner similar to the logical-to-physical entries of the LBA-indexed translation map 300 correlating L-pages to addresses in the real/physical address range 250, logical-to-virtual address entries of the LBA-indexed translation map 300 may be provided in volatile memory, such as a DRAM. The LBA-indexed translation map 300 may, therefore, comprise both logical-to-physical entries and logical-to-virtual entries. According to one embodiment, the logical-to-virtual address range 252 may be an extension of real/physical address range 250. Logical-to-virtual entries in the LBA-indexed translation map may be similar to logical-to-physical entries thereof 300, but may be mapped to a virtual address range that does not correspond to any real physical non-volatile memory. Alternatively, a logical-to-virtual LBA-indexed translation map may be maintained separately (physically and/or logically) from a logical-to-physical LBA-indexed translation map. The LBA-indexed translation map, therefore, may comprise, for example, a linear array of one entry per either physical or virtual address within the real/physical address range 250 and the virtual address range 252, and may be indexed by L-Page Numbers, as detailed above.

Figure 10:
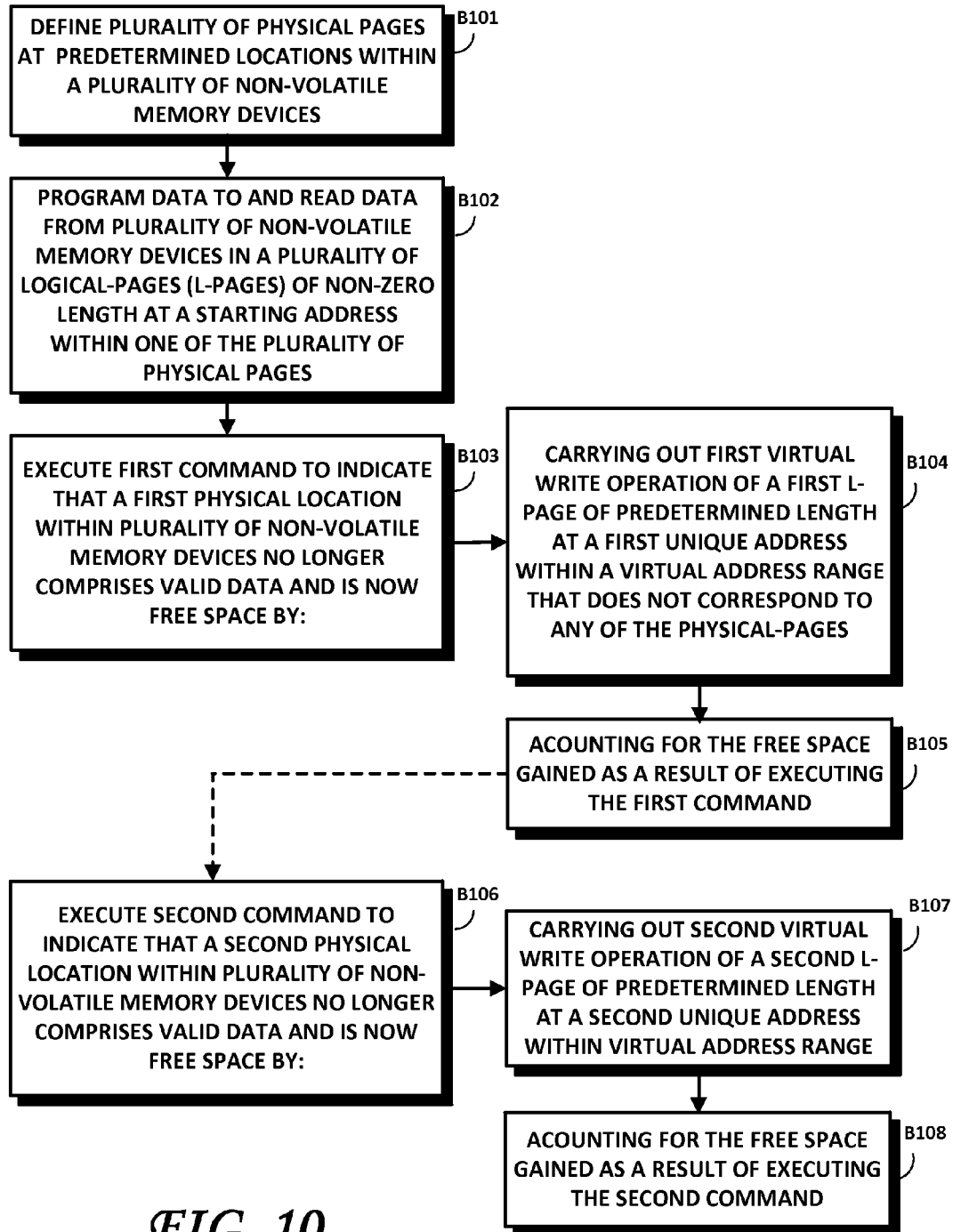
FIG. 10 is a flowchart of a method of controlling an array of non-volatile memory devices responsive to data access commands from a host, according to one embodiment.

FIG. 10 is a flowchart of a method of controlling an array of non-volatile memory devices responsive to data access commands from a host, according to one embodiment. The method may assumes that, according to one embodiment, a plurality of physical pages have been previously defined at predetermined locations within a plurality of non-volatile memory devices, as shown at Block B101. The method may also assume, according to one embodiment, that data has been programmed to and read from the plurality of memory devices, in a plurality of logical pages (L-Pages) of non-zero length at a starting address within one of the plurality of physical pages, as shown in Block B102. According to one embodiment, therefore, a method of controlling an array of non-volatile memory devices responsive to data access commands (such as TRIM, UNMAP, DISCARD or other functionally similar commands) from a host may comprise executing a first command to indicate that a first physical location within the plurality of non-volatile memory devices no longer contains valid data and is now free space. Such a command may comprise, according to one embodiment, carrying out a first virtual write operation of a first L-Page of a predetermined length at first a unique address within a virtual address range that does not correspond to any of the physical pages, as shown at B104, and accounting for the amount of free space gained as a result of executing the first command, as shown in Block B105.

As shown at B106, the method may also comprise executing a second command (in response to, e.g., the same type of command (e.g., TRIM etc.) as discussed relative to B103) to indicate that a second physical location within the plurality of non-volatile memory devices no longer contains valid data and is now free space. As in Block B104, such command may comprise a second virtual write operation of a second L-Page of a predetermined length at second unique address within the virtual address range, as shown in Block B107. According to one embodiment, this second unique address is different from the first unique address of Block B104. According to one embodiment, the consecutively-executed TRIM commands may result in virtual write operations to sequential and contiguous virtual addresses in the virtual address range 252. Thereafter, as in Block B108, an accounting may be carried out to track the amount of free space gained as a result of executing the second command. It is to be noted that the stale location and size of the L-Page is used for free space accounting purposes, in both Blocks B105 and B108. Subsequent reads to either the first or the second L-Page may, according to one embodiment, result in a lookup of an entry in the LBA-indexed address translation map and return a zero or other predetermined coded value in terms of length, return an address within the virtual address range or return a predetermined value of a special dedicated indicator.

The first and second virtual writes described above (and, according to one embodiment, all virtual writes associated with executing a TRIM or functionally-similar command) may be carried out as virtual writes to a one or more selected VS-Blocks in the virtual address range 252. Different virtual addresses are used for the first and second virtual writes, according to one embodiment, due to the physical-to-logical addressing scheme described and shown herein. As shown and described relative to FIGS. 7B and 8B, each S-Journal entry of S-Journals covering the virtual address range 252 may be configured to associate one or more virtual pages of a VS-Block to each L-Page. Each such S-Journal entry may be configured to define a size of the L-Pages in the virtual address range 252 as being of a non-zero size such as a size reflecting a maximally-compressed page size. According to one embodiment, such non-zero may be 24 bytes. Defining each S-Journal entry covering the virtual address range 252 as being of a non-zero size such as 24 bytes means that each such S-Journal may comprise a finite number of entries that correspond to a predetermined range of addresses within the virtual address range 252.

Significantly, with the above described embodiments, the controller 202 can carry out a host-issued TRIM or functionally similar commands, according to one embodiment, without accessing the Flash Blocks or by only writing a small amount of metadata to the Flash Blocks 206. Indeed, according to one embodiment, carrying out a TRIM or functionally-similar command may comprise updating the logical-to-virtual entries of the LBA-indexed translation map 300, generating a virtual address range S-Journal entry and accounting for free space. These operations may be carried out without, however, accessing (i.e., reading from or writing to) the Flash blocks 206 before the TRIM command can be considered complete. In particular, in one embodiment, each new S-Journal entry written to for a TRIM need not be written to Flash blocks 206 before a TRIM command is considered complete. Such S-Journal entries can be buffered and written out at a later time. Updating to logical-to-virtual entries of the LBA-indexed translation map 300, writing to an S-Journal (with buffered writing to Flash blocks) and accounting for free space, according to one embodiment, may be carried out significantly quicker than accesses to the Flash blocks 206. As a result, the time necessary to carry out such a TRIM or functionally-similar command according to one embodiment is correspondingly shorter than previously achievable.

This entails that the time necessary to TRIM an SSD storage device may be largely dependent on how fast virtual address range S-Journal entries may be written. For example, to TRIM a 3.2 TB max capacity SSD storage device may generate on the order of 6 GB of virtual address range S-Journal entry data. Such may be carried out (using two times over-provisioned lower page only writes to the System Band) in less than two seconds. As SSD storage devices may need to be entirely TRIMed before leaving the factory, carrying out TRIM operations according to one embodiment may significantly reduce the overall manufacturing time of such SSD storage devices. Effectively, the only additional physical resources that may be needed to implement one embodiment may be a slightly larger volatile memory, to store a few extra MB of space for the S-Journal map.

According to one embodiment, the predetermined length of the virtual writes carried out as a result of executing a TRIM command may be zero. According to one embodiment, each of the plurality of L-Pages of non-zero length may be associated with an L-Page number that is configured to enable the controller 202 to logically reference data stored in one or more of the physical pages. Similarly, according to one embodiment, each of the plurality of L-Pages of predetermined length (e.g., zero length) may be associated with an L-Page number of a TRIMed L-Page, thereby enabling the controller 202 to logically reference an address within the virtual address range. As noted above, a plurality of virtual address range S-Journals may be maintained, each defining virtual-to-logical correspondences. According to one embodiment, one or more of the virtual address range S-Journals may be associated with a journal number (see FIG. 5B), cover a predetermined range of addresses within the virtual address range 252 and comprise a plurality of journal entries (FIG. 6), each such entry being configured to associate one or more virtual addresses within the virtual address range 252 to each L-Page.

As noted above, the LBA-indexed translation map 300, comprising both logical-to-physical and logical-to-virtual entries, may need to be rebuilt after a restart or other event. To rebuild the LBA-indexed translation map 300, according to one embodiment, the controller 202 may read the entries of the S-Journals and the entries of the virtual address range S-Journals in the order in which they were created and, from the information therein, may rebuild the entries of the LBA-indexed translation map 300.

According to one embodiment, garbage collection may be carried out on the VS-Blocks in a manner that is similar to the process of garbage collecting in the System or User Bands. However, according to one embodiment, as the virtual address range does not store any data, valid data need not be copied and relocated. According to one embodiment, garbage collecting, therefore, may comprise selecting one of a plurality of VS-Blocks 704B (FIG. 8B) to garbage collect and comparing each entry in a virtual address range S-Journal for the selected VS-Block to logical-to-virtual entries of the LBA-indexed translation map 300. Entries in the virtual address range S-Journal that match may then be designated as valid and entries of the virtual address range S-Journal that do not match may be designated as being invalid. Thereafter, the logical-to-virtual entries of the LBA-indexed translation map 300 may be suitably updated such that the valid entries point to new respective virtual addresses, thereby effectively causing a re-write of valid entries to a different area of the virtual address range 252. Thereafter, new virtual address range S-Journal entries may be generated for the logical-to-virtual entries of the updated LBA-indexed translation map 300, such that the garbage collecting effectively causes a re-write of valid entries to a different virtual address range S-Journal.

Figure 11:
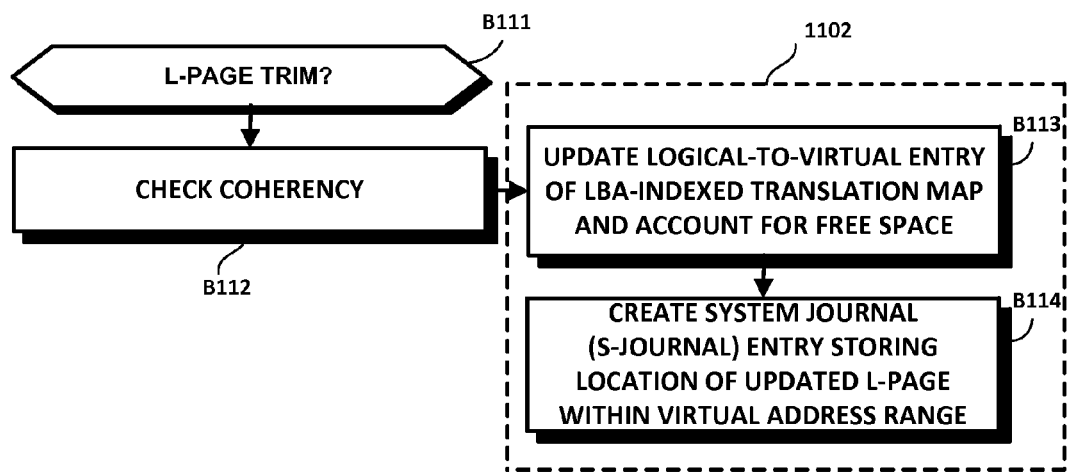
FIG. 11 shows aspects of a method for updating a logical-to-virtual entry of the LBA-indexed translation map and for creating an entry in a virtual address range S-Journal, according to one embodiment.

FIG. 11 shows aspects of a method for updating logical-to-virtual entries of the LBA-indexed translation map 300 and for creating a virtual address range S-Journal entry upon processing a TRIM or functionally-equivalent command, according to one embodiment. As shown therein, upon receipt of a TRIM or functionally-equivalent command as shown at B111, a coherency check may be carried out as shown at B112, to determine whether the L-page that is the subject of the TRIM command is currently being updated. If the L-page that is subject to the TRIM command is indeed being currently being updated, the updating process may be allowed to run its course prior to the TRIM command being executed, to ensure that the logical-to-physical entry of the LBA-indexed translation map 300 is properly updated and that an entry corresponding to the L-page being updated is made in an S-Journal, to enable proper reconstruction of the LBA-indexed translation map 300 in the event of a power failure or other event requiring such rebuilding. If the L-page that is the subject of the TRIM command is not being updated or that a previously detected update has been completed, the processing of the TRIM command may be carried out, as shown at 1102. Indeed, the logical-to-virtual entry of the LBA-indexed translation map 300 may be updated as shown at B113.

According to one embodiment, an L-Page may be TRIMed by carrying out a virtual write to the virtual address range 252, which virtual write may be carried out by changing the length of the L-Page to, for example, zero or a predetermined size such as 24 bytes and creating a corresponding entry in a virtual address range S-Journal and correspondingly updating the logical-to-virtual address entry of the LBA-indexed translation map 300. As S-Journals covering the virtual address range 252 may comprise thousands of entries (depending, for example, upon the size of the maximally-compressed L-Page), it is more likely than not that Block B114 will not necessitate creating a virtual address range S-Journal. However, if the immediately prior virtual address range S-Journal entry was the last entry for that particular S-Journal, Block B114 may require the creation of a new virtual address range S-Journal. According to one embodiment, virtual writes to the virtual address range 252 may be carried out sequentially, and a pointer may be kept, pointing to the next available address in the virtual address range 252. Upon the next virtual write occasioned by a TRIM or functionally similar operation, an entry in the current virtual address range S-Journal (whose S-Journal number points to the starting address in the virtual address range 252 of the current virtual address range S-Journal) may be generated, using the location within the virtual address range pointed at by the virtual address range pointer.

Therefore, according to one embodiment, a TRIM or functionally-similar command may comprise a virtual write to the virtual address range, which causes the generation of a new entry in a virtual address range S-Journal and the updating of a System S-Block Information table with the amount of free space and the location of that free space, such as shown at 908 in FIG. 9A. According to one embodiment, the generation of the new entry in the virtual address range S-Journal may cause, for example, a 7 byte write, as shown at FIG. 6. That 7 byte write eventually may be flushed from a buffer in a volatile memory temporarily storing the virtual address range S-Journal to the System Band in non-volatile memory. Indeed, a virtual address range S-Journal may be buffered in volatile memory and the TRIM command reported as having been completed before the virtual address range S-Journal is written out to the Flash Blocks 206.

According to one embodiment, carrying out a physical write to a previously TRIMed L-Page may be carried out in the same manner described relative to FIG. 4, by writing the L-Page and suitably updating the LBA-indexed translation map 300. An S-Journal entry may also be created, storing therein information pointing to the location of the updated L-Page. Moreover, the free space in the relevant VS-Block may be accounted for, with reference to the length stored in the LBA-indexed translation map 300. For example, the amount of free space in the VS-Block freed as a result of this write may be a non-zero value equal to a maximally-compressed page size. Such maximally-compressed page size may be, for example, 24 bytes and such value may have previously been stored in the LBA-indexed translation map 300 and is the amount by which the free space in the relevant VS-Block may be increased.

In the case in which a TRIMed L-Page is again TRIMed, the second TRIM command may be ignored. Alternatively, to simplify implementation, the TRIM operation may be carried out again, and the free space may be increased in the VS-Block (of the TRIMed L-Page being replaced) in the same manner as free space would be increased if the TRIMed L-Page were to be replaced by a physical L-Page.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A data storage device, comprising:
a plurality of non-volatile memory devices configured to store a plurality of physical pages; and
a controller coupled to the plurality of non-volatile memory devices and configured to:
program data to and read data from the plurality of non-volatile memory devices, the data being stored in a plurality of logical pages (L-Pages) of non-zero length at a starting address within one of the plurality of physical pages; and
execute a first command to indicate that a first physical location within the plurality of non-volatile memory devices no longer contains valid data and is now free space by at least:
carrying out a first virtual write operation of a first L-Page of a predetermined length at a first unique address within a virtual address range that does not correspond to any of the physical pages; and
accounting for an amount of free space gained as a result of executing the first command; and
execute a second command to indicate that a second physical location within the plurality of non-volatile memory devices no longer contains valid data and is now free space by at least:
carrying out a second virtual write operation of a second L-Page of a predetermined length at a second unique address within the virtual address range, the first unique address being different from the second unique address; and accounting for an amount of free space gained as a result of executing the second command.

2. The data storage device of claim 1, wherein the predetermined length is zero.

3. The data storage device of claim 1, wherein the controller is further configured to execute the first command in response to a TRIM or UNMAP command received from a host system to which the data storage device is coupled.

4. The data storage device of claim 1, further comprising:
a volatile memory comprising an LBA-indexed translation map configured to enable the controller to:
determine a physical location, within one or more physical pages, of the data stored in each L-Page of non-zero length, and
determine addresses, within the virtual address range, corresponding to L-Pages of predetermined length.

5. The data storage device of claim 1, wherein each of the plurality of L-Pages of non-zero length is associated with an L-Page number that is configured to enable the controller to logically reference data stored in one or more of the physical pages.

6. The data storage device of claim 5, wherein each of the plurality of L-Pages of predetermined length is associated with an L-Page number that is configured to enable the controller to logically reference an address within the virtual address range.

7. The data storage device of claim 1, wherein the controller is further configured to maintain, in the plurality of non-volatile memory devices, a plurality of journals defining virtual-to-logical correspondences, wherein at least one journal is configured to:
be associated with a journal number,
cover a predetermined range of addresses within the virtual address range; and
comprise a plurality of journal entries, each entry being configured to associate one or more virtual addresses to each L-Page.

8. The data storage device of claim 7, further comprising a volatile memory configured to store an LBA-indexed translation map, and wherein the controller is further configured to read the plurality of journals upon startup and rebuild, using the read plurality of journals, the LBA-indexed translation map.

9. The data storage device of claim 8, further comprising a plurality of virtual super blocks (VS-Blocks), each comprising one or more virtual memory blocks in the virtual address range and wherein each of the plurality of journal entries is configured to associate one or more virtual pages of the VS-Block to each L-Page.

10. The data storage device of claim 9, wherein the controller is further configured to garbage collect by at least:
selecting one of the plurality of VS-Blocks to garbage collect;
comparing each entry in a journal for the selected VS-Block to entries in the LBA-indexed translation map and designating entries that match as valid and entries that do not match as invalid;
updating the LBA-indexed translation map for the valid entries to point to new respective virtual addresses; and
generating new journal entries for the entries for which the LBA-indexed translation map was updated.

11. The data storage device of claim 10, wherein each journal entry defines a size of one of the plurality of L-Pages in the virtual address range as being of a non-zero size that is equal to a pre-determined maximally compressed size, such that each journal comprises a finite number of entries that correspond to a predetermined range of addresses within the virtual address range.

12. A solid state drive controller, comprising:
a buffer configured to couple to an array of Flash memory devices configured to store a plurality of physical pages; and
a processor coupled to the buffer, the processor being configured to:
program data to and read data from the array of Flash of memory devices responsive to data access commands from a host, the data being stored in a plurality of logical pages (L-Pages) of non-zero length at a starting address within one of the plurality of physical pages; and
execute a first command to indicate that a first physical location within the array of Flash memory devices no longer contains valid data and is now free space by at least:
carrying out a first virtual write operation of a first L-Page of a predetermined length at a first unique address within a virtual address range that does not correspond to any of the physical pages; and
accounting for an amount of free space gained as a result of executing the first command;
execute a second command to indicate that a second physical location within the array of Flash memory devices no longer contains valid data and is now free space by at least:
carrying out a second virtual write operation of a second L-Page of a predetermined length at a second unique address within the virtual address range, the first unique address being different from the second unique address; and
accounting for an amount of free space gained as a result of executing the second command.

13. The solid state drive controller of claim 12, wherein the predetermined length is zero.

14. The solid state drive controller of claim 12, wherein the processor is further configured to execute the first command in response to a TRIM or UNMAP command received from the host.

15. The solid state drive controller of claim 12, further comprising:
a volatile memory comprising an LBA-indexed translation map and wherein the processor is further configured to:
determine a physical location, within one or more physical pages, of the data stored in each L-Page of non-zero length, and
determine addresses, within the virtual address range, corresponding to L-Pages of predetermined length.

16. The solid state drive controller of claim 12, wherein each of the plurality of L-Pages of non-zero length is associated with an L-Page number that is configured to enable the controller to logically reference data stored in one or more of the physical pages.

17. The solid state drive controller of claim 16, wherein each of the plurality of L-Pages of predetermined length is associated with an L-Page number that is configured to enable the processor to logically reference an address within the virtual address range.

18. The solid state drive controller of claim 12, wherein the processor is further configured to maintain, in the array of Flash memory devices, a plurality of journals defining virtual-to-logical correspondences, wherein at least one journal is configured to:
be associated with a journal number;

cover a predetermined range of addresses within the virtual address range; and comprise a plurality of journal entries, each entry being configured to associate one or more virtual addresses to each L-Page.

19. The solid state drive controller of claim 18, wherein the controller is configured to couple to a volatile memory configured to store an LBA-indexed translation map, and wherein the processor is further configured to read the plurality of journals upon startup and rebuild, using the read plurality of journals, the LBA-indexed translation map.

20. The solid state drive controller of claim 19, further comprising a plurality of virtual super blocks (VS-Blocks), each comprising one or more virtual memory blocks in the virtual address range and wherein each of the plurality of journal entries is configured to associate one or more virtual pages of the VS-Block to each L-Page.

21. The solid state drive controller of claim 20, wherein the controller is further configured to garbage collect by at least:
selecting one of the plurality of VS-Blocks to garbage collect;
comparing each entry in a journal for the selected VS-Block to entries in the LBA-indexed translation map and designating entries that match as valid and entries that do not match as invalid;
updating the LBA-indexed translation map for the valid entries to point to new respective virtual addresses; and
generating new journal entries for the entries for which the LBA-indexed translation map was updated.

22. The solid state drive controller of claim 20, wherein each journal entry defines a size of one of the plurality of L-Pages in the virtual address range as being of a non-zero size that is equal to a pre-determined maximally compressed size, such that each journal comprises a finite number of entries that correspond to a predetermined range of addresses within the virtual address range.

23. A method of controlling an array of non-volatile memory devices responsive to data access commands from a host, the array of non-volatile memory devices being configured to store a plurality of physical pages, the method comprising:
programming data to and read data from the array of memory devices, the data being stored in a plurality of logical pages (L-Pages) of non-zero length at a starting address within one of the plurality of physical pages; and
executing a first command to indicate that a first physical location within the array of non-volatile memory devices no longer contains valid data and is now free space, by at least:
carrying out a first virtual write operation of a first L-Page of a predetermined length at first unique address within a virtual address range that does not correspond to any of the physical pages; and
accounting for an amount of free space gained as a result of executing the first command; and
executing a second command to indicate that a second physical location within the plurality array of non-volatile memory devices no longer contains valid data and is now free space, by at least:
carrying out a second virtual write operation of a second L-Page of a predetermined length at second unique address within the virtual address range, the first unique address being different from the second unique address; and
accounting for an amount of free space gained as a result of executing the second command.

24. The method of claim 23, wherein the predetermined length is zero.

25. The method of claim 23, wherein executing is carried out in response to a TRIM or UNMAP command received from the host.

26. The method of claim 23, further comprising:
determining a physical location, within one or more physical pages, of the data stored in each L-Page of non-zero length, and
determining addresses, within the virtual address range, corresponding to L-Pages of predetermined length.

27. The method of claim 23, wherein each of the plurality of L-Pages of non-zero length is associated with an L-Page number that is configured to enable the controller to logically reference data stored in one or more of the physical pages.

28. The method of claim 27, wherein each of the plurality of L-Pages of predetermined length is associated with an L-Page number that is configured to enable the controller to logically reference an address within the virtual address range.

29. The method of claim 23, further comprising maintaining, in the array of non-volatile memory devices, a plurality of journals defining virtual-to-logical correspondences, wherein at least one journal is configured to:
be associated with a journal number,
cover a predetermined range of addresses within the virtual address range; and
comprise a plurality of journal entries, each entry being configured to associate one or more virtual addresses to each L-Page.

30. The method of claim 29, further comprising reading the plurality of journals upon startup and rebuilding, using the read plurality of journals, an LBA-indexed translation map.

31. The method of claim 30, further comprising a plurality of virtual super blocks (VS-Blocks), each comprising one or more virtual memory blocks in the virtual address range and wherein each of the plurality of journal entries is configured to associate one or more virtual pages of the VS-Block to each L-Page.

32. The method of claim 31, further comprising garbage collecting by at least:
selecting one of the plurality of VS-Blocks to garbage collect;
comparing each entry in a journal for the selected VS-Block to entries in the LBA-indexed translation map and designating entries that match as valid and entries that do not match as invalid;
updating the LBA-indexed translation map for the valid entries to point to new respective virtual addresses; and
generating new journal entries for the entries for which the LBA-indexed translation map was updated.

33. The method of claim 32, wherein each journal entry defines a size of one of the plurality of L-Pages in the virtual address range as being of a non-zero highly compressed size, such that each journal comprises a finite number of entries that correspond to a predetermined range of addresses within the virtual address range.

* * * * *